J. GOODELMAN.
CLOTH CUTTING MACHINE.
APPLICATION FILED AUG. 9, 1911.
1,011,185.
Patented Dec. 12, 1911.
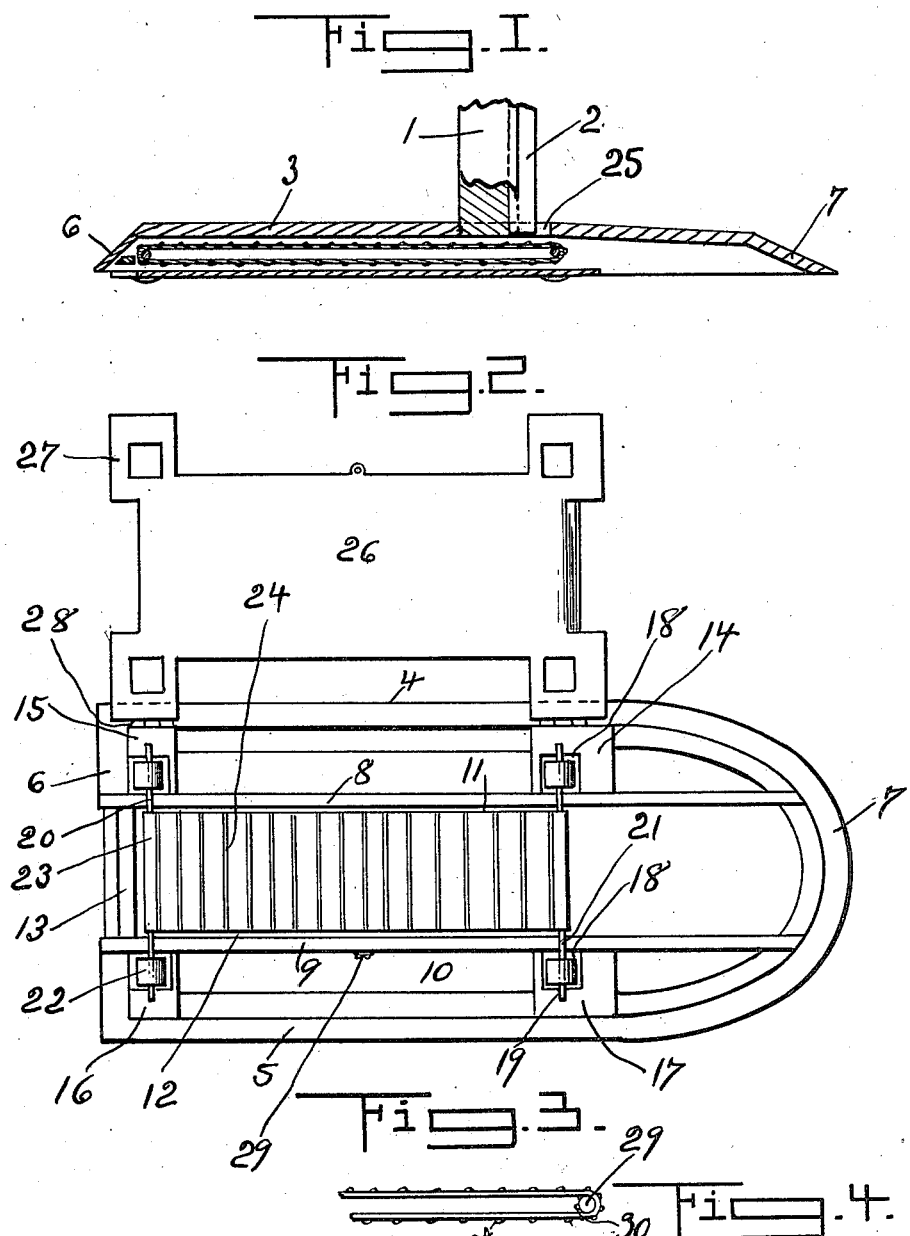

UNITED STATES PATENT OFFICE.

JOSEPH GOODELMAN, OF NEW YORK, N. Y.

CLOTH-CUTTING MACHINE.

1,011,185. Specification of Letters Patent. Patented Dec. 12, 1911.

Application filed August 9, 1911. Serial No. 643,246.

*To all whom it may concern:*

Be it known that I, JOSEPH GOODELMAN, a subject of the Czar of Russia, and resident of the city of New York, in the county of New York and State of New York, have invented certain new and useful Improvements in Cloth-Cutting Machines, of which the following is a specification.

This invention relates to certain new and useful improvements in cloth cutting machines of the Ballard or Eastman type or any cloth-cutting machine having a base, more particularly to the machine base and has for its object to provide in a manner as hereinafter set forth a base for use in connection with cloth cutting machines of the Ballard or Eastman type, or any cloth cutting machine having a base, to overcome the necessity of the operator cleaning the knife slit, base supporting rollers and their axles from dust and particles of threads which is a source of considerable inconvenience and a waste of time.

A further object of the invention is to provide in a manner as hereinafter set forth a base for the use of cloth cutting machines of the Ballard or Eastman type, or any other cloth cutting machine having a base, with means to overcome the clogging of the knife slit and the supporting rollers of the base by dust or particles of cloth thereby increasing the efficiency of the machine when in use.

Further objects of the invention are to provide a base for use in cloth cutting machines of the Ballard or Eastman type, or any cloth-cutting machine having a base with means in a manner as hereinafter set forth for conducting dust and small particles of thread away from the knife slit as the knife operates and discharging the dust or small particles of thread from one end of the base thereby reducing clogging of the knife slit and supporting rollers of the base to a minimum.

Further objects of the invention are to provide a base for cloth cutting machines of the Ballard or Eastman type or any other cloth-cutting machine having a base which is comparatively simple in its construction and arrangement, strong, durable, efficient in its use, readily set up and comparatively inexpensive to manufacture.

With the foregoing and other objects in view, the invention consists of the novel construction, combination and arrangement of parts as hereinafter more specifically described and illustrated in the accompanying drawing, wherein is shown the embodiment of the invention, but it is to be understood that changes, variations and modifications can be resorted to which come within the scope of the claims hereunto appended.

In the drawings wherein like reference characters denote corresponding parts through the several views: Figure 1 is a longitudinal sectional view of a base for a cloth cutting machine of the Ballard type in accordance with this invention. Fig. 2 is an inverted plan of the base with the closure plate therefor open. Fig. 3 is a detail broken away of a modified form of conveyer, and Fig. 4 is a detail broken away of still another modified form of conveyer.

Referring to the drawing by reference characters, 1 denotes the machine standard on which is carried the operating mechanism (not shown) for the reciprocatory knife 2. The standard 1 is fixed to the top of a supporting base, the latter consisting of a top plate 3, side walls 4, 5, and end walls 6, 7. The walls 4 to 7 maintain the top plate 3 in an elevated position as clearly shown in Fig. 1. The end wall 6 is formed with two sections and integral with each of said sections and extending to the end wall 7 is a longitudinal web. The webs are indicated by the reference characters 8, 9 and form in connection with the side walls 4, 5 pockets 10, 11. The webs 8, 9 are spaced from each other and provide what may be termed a conveyer chamber 12 having an outlet 13 at the rear end of the base.

Formed integral with each of the webs is a pair of laterally extending cross members, the members of one pair being indicated at 14, 15 and the members of the other pair being designated 16, 17. Each of said members is provided with a pocket 18 and a recess 19 which opens into the pocket 18.

Journaled in the recesses 19, extending across the pockets 18 and also extending through the webs 8, 9 is a pair of spindles 20, 21, the former being positioned at the rear of the base, while the latter is positioned in proximity to the forward end of the base. Each of said spindles has fixed thereto a roller 22 which is adapted to support the base and which also permits of the base being freely moved upon a support or table. The rollers 22 are positioned upon the spindles within the pockets 18. The spindles 20, 21 are connected together by an endless conveyer 23 provided with transversely-extending ribs 24 upon its outer face. The length of the conveyer is such as to project forwardly of the knife slit 25 which is formed in the top plate 3 of the base, so that the small particles of thread or cloth will fall upon the conveyer so that when the machine is shifted the rollers 22 will cause the spindles to revolve, thereby imparting movement to the conveyer so that the dust or small particles of cloth will be carried to and discharged through the outlet 13. When the machine moves in a forward direction the conveyer will travel in what may be termed a rearward direction so as to convey the dust and small particles of thread or cloth toward the outlet 13.

A closure plate is provided for the conveyer chamber 12 and consists of a rectangular body portion 26 having an apertured extension 27 at each corner through which depend the rollers 22 as clearly shown in Fig. 1. The closure plate is hinged at 28 to one side of the base and is adapted to be detachably secured in position by a catch or other connecting means as indicated at 29. The closure plate is of less length than the length of the base. The apertured extensions 27 constitute means for maintaining the spindles in position.

The modified form of conveyer shown in Fig. 3 consists in providing one of the spindles which is indicated by the reference character 29 with barbs 30 adapted to engage into the conveyer for shifting it when the spindle is revolved.

In the modified form shown in Fig. 4 the conveyer is indicated at 31 and is provided throughout its outer face with bristles 32 to facilitate the transferring of the dust or small pieces of cloth to the outlet end of the base.

The ribs 24 may consist of rubber strips or may be formed of any other suitable material.

What I claim is:—

1. In cloth cutting machines, a base provided below its top with a conveyer chamber, an endless conveyer mounted in said chamber, and a closure plate for the conveyer chamber, said closure plate hinged at one side to one side of the base and having its opposite side detachably-secured to the opposite side of the base, said closure plate acting to retain the conveyer in position in the conveyer chamber and as a bottom for the latter.

2. A base for cloth cutting machines provided with a conveyer chamber, a conveyer in said chamber, and a closure plate hinged to the base, said closure plate constituting means for retaining the conveyer in position in the conveyer chamber and forming the bottom of said chamber.

Signed at the city of New York in the county of New York and State of New York this seventh day of August A. D. 1911.

JOSEPH GOODELMAN.

Witnesses:
AARON GOODELMAN,
NATHAN COHEN.

Copies of this patent may be obtained for five cents each, by addressing the "Commissioner of Patents, Washington, D. C."